United States Patent [19]

Fletcher et al.

[11] 4,033,479
[45] July 5, 1977

[54] PRESSURE MODULATING VALVE

[76] Inventors: James C. Fletcher, Administrator of the National Aeronautics and Space Administration, with respect to an invention of; David S. Jacob, Irvine, Calif.

[22] Filed: July 26, 1976

[21] Appl. No.: 708,795

[52] U.S. Cl. .................................. 222/61; 222/95; 128/214 F; 128/DIG. 12
[51] Int. Cl.² ........................ B67D 5/28; B67D 5/14
[58] Field of Search ............ 222/52, 61, 95, 386.5, 222/389; 128/214 F, DIG. 12

[56] References Cited

UNITED STATES PATENTS

| | | | |
|---|---|---|---|
| 3,561,644 | 10/1967 | Works | 222/95 |
| 3,827,599 | 8/1974 | Rastogi | 222/52 |

*Primary Examiner*—Stanley H. Tollberg
*Assistant Examiner*—Hadd S. Lane
*Attorney, Agent, or Firm*—Russell E. Schlorff; Marvin F. Matthews; John R. Manning

[57] ABSTRACT

Operating fluid pressure is supplied to a fluid motor past a modulating operating fluid pressure and a work pressure so as to control the work pressure.

11 Claims, 2 Drawing Figures

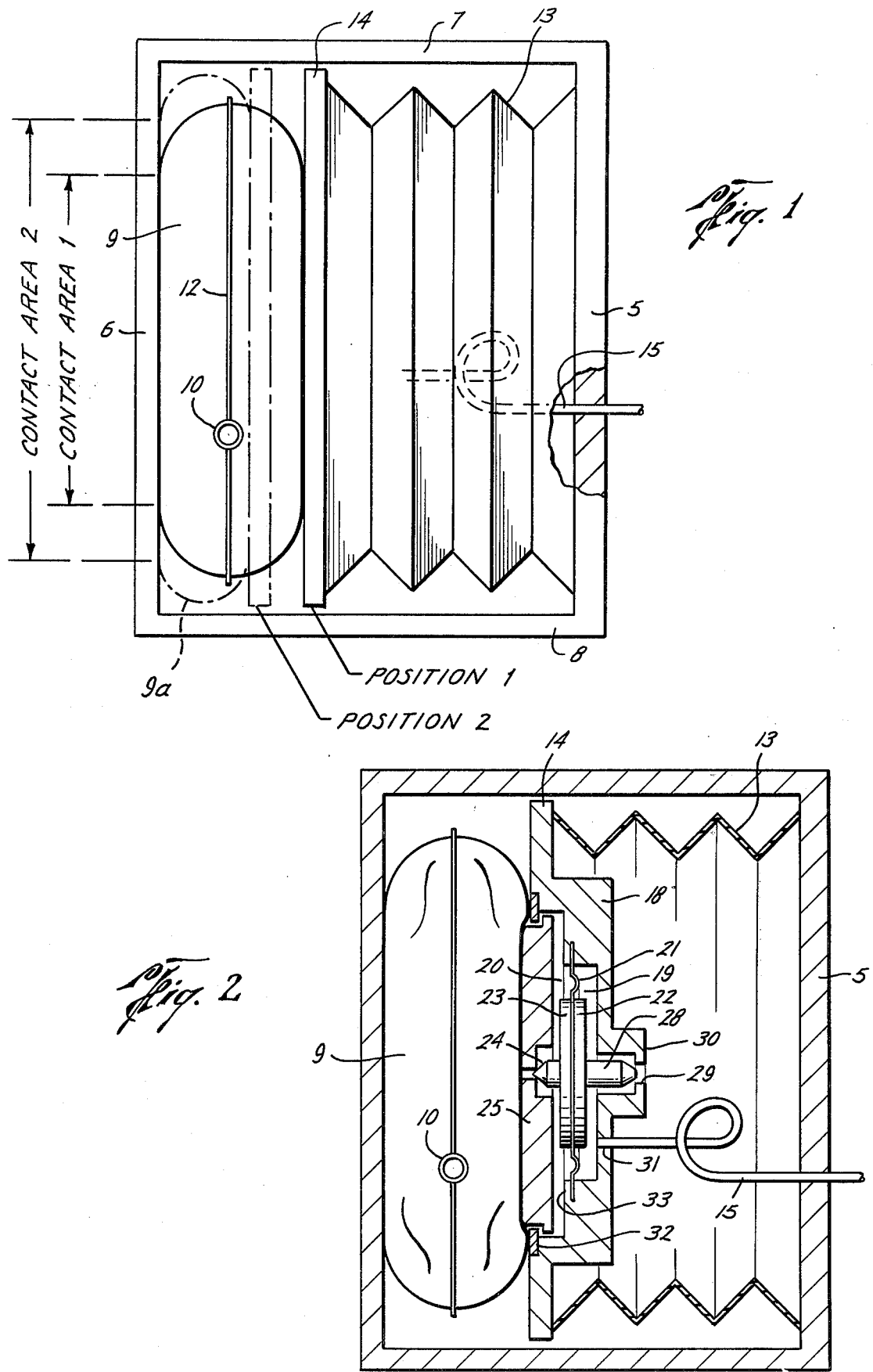

PRESSURE MODULATING VALVE

ORIGIN OF THE INVENTION

The invention described herein was made in the performance of work under a NASA contract and is subject to provisions of Section 305 of the National Aeronautics and Space Act of 1958, Public Law 85-568 (72 stat. 435; 45 U.S.C. 2457).

BACKGROUND OF THE INVENTION

Prior art devices for expelling fluids from flexible bag-like containers, for instance, in zero-gravity environment, as in space travel, have resulted in a problem due to the steady decrease in flow rate of the expelled fluid. An example of such a system is an apparatus for administering intravenous solutions, as may be required in future space travel. In ground-based facilities, reasonably accurate flow may be maintained by means of a gravity induced head pressure. However, where pressure plates or other squeezing means must be utilized to maintain the fluid flow from a container bag, due to the compliant nature of the bag, the surface area against which the external squeezing pressure is applied increases as the bag empties. Thus, a constant squeezing force will result in decreasing internal pressure in the container bag and resultant decreasing flow rate.

Accordingly, the main object of the present invention is to provide a novel pressure modulating valve which maintains a constant internal pressure in the container with a resultant constant flow rate.

SUMMARY OF THE INVENTION

In accordance with one embodiment of the present invention, one or more bag-like containers are mounted in position to be squeezed between a pair of walls, one of which is actuated by an expansible-chamber type pneumatic motor, such as a bellows. The movable wall carries a chambered valve housing which is traversed by a diaphragm to form on one side thereof a pressure chamber communicating with the supply pressure. On the other side of the diaphragm, there is a sensing plate or disc which reacts against the container pressure and is centrally coupled to the diaphragm. Extending from the diaphragm oppositely from the sensing plate is a needle valve which controls a valve seat-port and allows the supply pressure in the pressure chamber to communicate with the actuating pressure in the pneumatic motor. Thus, the diaphragm and needle valve are balanced between the force imparted by the supply pressure on the diaphragm and the reacting force on the sensing plate imparted by the internal pressure of the bag-like container. As the container empties, the valve operates in such a way so as to provide a substantially uniform hydrostatic pressure in the container and resultant uniform discharge therefrom.

BRIEF DESCRIPTION OF THE DRAWING

In the accompanying drawing,

FIG. 1 is an elevation of a fluid discharge device embodying the invention, a part being broken away and the flexible container being shown in different operating positions.

FIG. 2 is a schematic longitudinal section illustrating the working parts.

DETAIL DESCRIPTION OF THE DRAWING

The embodiment shown comprises a rectangular hollow frame having end members 5 and 6 and top and bottom members 7 and 8. Received in one portion of the frame is the container bag 9 having an outlet fitting 10 in the peripheral seam 12, to which a discharge tube may be connected. In the opposite portion of the frame there is placed the bellows 13 secured at one end to frame member 5 and at the other to a movable wall or plate 14 interposed between the actuating bellows and the container bag. A tube 15 connects a constant pressure source of pneumatic fluid through frame member 5 with pressure chamber 19, as will be described.

If desired, two or more of the containers 9 may be mounted in side by side chambers on frame member 6 and equipped with suitable piping and valves for joint or sequential operation. Wall 6 may be formed in part of transparent solid material so that proper loading of the bags into the chambers may be verified visually. Design of the container portion of the apparatus, in the exemplary embodiment, was such that a complete tubing set could be laid into the unit without violating its sterility. Other values and gauges may be provided where needed.

Mounted on movable wall 14 (FIG. 2) is the novel modulator valve including a housing 18 formed as a part of plate 14 and with a centrally projecting boss 30, both hollowed to form the stepped chamber 19, 20. Traversing this chamber and defining and segregating pressure chamber 19 is the diaphragm 21 peripherally secured in place by a clamping ring 33 and provided with central pressure plates 22 and 23. Projecting leftwardly from plate 23 is a pin or plunger 24, the left hand end of which impinges on a sub-plate or disc 25 which is movably secured at its periphery to movable wall by a ring 32. Sub-plate or disc 25, in normal use, bears against a portion of the side surface of container bag 9, so as to reflect container pressure in opposition to the force exerted by the actuating pressure on diaphragm 21. Plate 25 and plunger 24 act as a self-aligning "ball and socket" joint to assure that bag 9 is in contact with plate 25 over the entire area of the plate regardless of the manner the bag is inserted in the frame.

Projecting rightwardly from the other diaphragm pressure plate 22 is a needle valve 28 having a tapered end for cooperating with the valve-seat-port 29 in hollow boss 30 projecting from housing 18. An orifice 31 in the end wall of housing 18 exposes pressure chamber 19 and the right hand side of the diaphragm to the constant supply pressure provided through tubing 15.

OPERATION

In operation, with bellows 13 relaxed, a charged container 9 is placed between frame end member 6 and movable wall 14. Then, with all plumbing properly connected and adjusted, activating pneumatic gas is supplied through tube or pipe 15 to pressure chamber 19. When the force exerted by the pneumatic fluid through diaphragm 21 exceeds the counteracting container pressure, needle valve 28 opens, admitting pneumatic fluid to the interior of the bellows and ultimately causing expansion of the bellows to squeeze the container bag. With the container fluid discharge valve open, this fluid is expelled from the bag. The dimension lines marked "Contact Area 1" indicates the area of the container walls initially engaged by squeezing walls 6 and 14 in "Position 1." As fluid expulsion continues, movable wall 14 reaches the dot-and-dash line "Position 2," while the container assumes the flattened, laterally expanded shape indicated by dot-and-dash lines 9a. The dimension line marked "Contact Area 2" indicates the increased areas of engagement between the pressure walls 6 and 14 and the container surfaces. Accordingly, the squeezing force applied by the bellows is progressively more diffused and the internal container pressure, per advance increment of the movable wall, is reduced.

To compensate for the resultant reduction in hydrostatic pressure in the container and consequent reduction in discharge rate, such pressure reduction results in a leftward shifting of inner, movable wall portion 25 and the diaphragm relative to movable wall 14 and opening of needle valve 28 to admit additional actuating pressure gas into the bellows through tube 15 and port 29. This, in turn, will provide the necessary compensating increase in squeezing force on the container to maintain the discharge from the container at a uniform rate. When the uniform discharge rate is restored, needle valve 28 will close or assume an intermediate position where leakage through port 29 will be just sufficient to continuously balance the pressure decay tendency as mentioned above, during emptying of the bag.

With the use of the invention as described, it was found possible to produce a constant flow within ±8% at lower flow rates, and ±5% at higher flow rates. These flow rates are substantially better than has been obtained with conventional fluid infusion system of the same general type under zero-gravity conditions. The system is especially advantageous for space flights because of the absence of any electrical power feature, complete portability, light weight and small volume, while being rugged and reliable.

Other fluid pressure to linear force conversion motor devices may be utilized, such as cylinders, bladders, and diaphragms. Moreover, the modulating valve concept may be used in other work applications, as for compressing any visco-elastic material or object where constant internal pressure is desired. One such application might be compression molding of plastics. As the molding material is compressed and spreads within the mold cavity, the area of reactive contact in the molds increases so that the rate of pressure increase within the visco-elastic material decreases per unit advance of the compressor ram at constant force. If, however, the pneumatic or hydraulic ram force is increased in proportion to the spread of the contact of the molding material within the mold, as by application of the present invention, the density of the molded part may be maintained constant throughout.

The invention may be modified in these and other respects as will occur to those skilled in the art and the exclusive use of all modifications as come within the scope of the appended claims is contemplated.

I claim:

1. A modulating valve device comprising first and second relatively movable wall means, respectively for transmitting force applied by a fluid motor to a work instrumentality and for sensing the reactive pressure of the work, a valve housing having a movable wall and forming a pressure chamber, first and second ports in the wall of said chamber, respectively, for admitting actuating fluid to said chamber and directing said fluid to the fluid motor, a valve actuable by said movable wall and cooperable with said second port, and a connection between said sensing wall means and said movable wall acting on said movable wall in opposition to the effect of the actuating fluid thereon.

2. A modulating valve device as described in claim 1 in which said movable wall is a flexible diaphragm traversing said chamber and said valve is secured centrally thereto.

3. A modulating valve device as described in claim 1 in which said first and second relatively movable wall means form a continuous wall, said first wall means being adapted for connection to a fluid motor and said second wall means being movably mounted in a central aperture in first wall means.

4. A modulating valve as described in claim 3 in which said movable wall is a diaphragm traversing said chamber to form a pressure chamber on one side thereof and said second wall means is actuably connected to the other side of said diaphragm.

5. A modulating valve device as described in claim 4 in which said fluid motor is a bellows peripherally attached to said first wall means.

6. The combination with a compressible means of a type subject to pressure variation when compressed and motor means for applying compressive force to said compressible means, of modulating means responsive to the reactive pressure of said compressible means for adjusting the compressive force applied by said motor means in proportion to the pressure change in said compressible means.

7. The combination described in claim 6 in which said motor means is fluid pressure actuated and further including a source of pressured actuating fluid, said modulating means comprising a valve controlling the pressure applied to said motor means for varying the compressive force applied by said motor means.

8. The combination described in claim 7 in which said compressible means comprises a bag-like fluid container and said motor means includes a movable wall bearing against an increasing area of the container wall as the container empties during squeezing thereof.

9. The combination described in claim 8 further including a hollow housing carried by said movable wall, a diaphragm traversing the interior of said housing and forming therewith a pressure chamber on one side of said diaphragm, first and second port means connecting said pressure chamber, respectively to said source of actuating fluid and said motor means, the portion of said movable wall traversing said housing interior and engageable with said bag-like container being transversely movable relative to adjacent parts of said movable wall, and a connection between said latter mentioned movable wall portion and said diaphragm, said modulating means comprising a valve actuable by said diaphragm and cooperable with said second port means to vary the pressure applied by said motor means.

10. The combination described in claim 9 in which said motor means is of the expansible chamber type with an actuating part connected to said movable wall.

11. The combination described in claim 9 further including a rigid frame having opposed walls, said motor means, including said movable wall, being received in one portion of said frame adjacent one of said opposed walls and said bag-like container being received in another portion of said frame between said movable wall and the other opposed wall, said container being replaceable and there being an opening in the side of said latter frame portion for introduction and removal of charged and exhausted containers.

* * * * *